United States Patent [19]

Yeater

[11] Patent Number: 4,525,575

[45] Date of Patent: Jun. 25, 1985

[54] POLYESTER POLYOLS AND MIXTURES MADE THEREFROM

[75] Inventor: Robert P. Yeater, Moundsville, W. Va.

[73] Assignee: Mobay Chemical Corporation, Pittsburgh, Pa.

[21] Appl. No.: 520,665

[22] Filed: Aug. 5, 1983

[51] Int. Cl.³ ............................................. C08G 63/66
[52] U.S. Cl. .................................. 528/301; 252/182; 528/272
[58] Field of Search ............................... 528/272, 301

[56] References Cited

U.S. PATENT DOCUMENTS

| | | | |
|---|---|---|---|
| 3,079,350 | 2/1963 | Bernstein | 521/172 |
| 3,993,576 | 11/1976 | Barrow | 252/182 |
| 4,029,593 | 6/1977 | Scapel et al. | 252/182 |
| 4,141,852 | 2/1979 | Hogan et al. | 252/182 |
| 4,415,469 | 11/1983 | Tsai | 252/182 |
| 4,436,841 | 3/1984 | Rasshofer et al. | 252/182 |

FOREIGN PATENT DOCUMENTS 95116 11/1983 European Pat. Off.

*Primary Examiner*—A. Lionel Clingman
*Attorney, Agent, or Firm*—Gene Harsh; Joseph C. Gil

[57] ABSTRACT

The present invention is directed to a polyester polyol having an hydroxyl number of from about 25 to about 130 and an acid number of 2 or less, produced by reacting (a) from about 40 to about 60 parts by weight of adipic acid,
(b) from about 1 to about 20 parts by weight of ethylene glycol,
(c) from about 1 to about 30 parts by weight of 1,4-butanediol, and
(d) from about 5 to 50 parts by weight of a polyoxyethylene glycol having a molecular weight of from 106 to 680, the total parts of (a), (b), (c) and (d) being 100, and to a blend of such polyester polyol with 1,4-butanediol and/or ethylene glycol.

4 Claims, No Drawings

POLYESTER POLYOLS AND MIXTURES MADE THEREFROM

BACKGROUND OF THE INVENTION

Polyol systems, which are to be reacted with polyisocyanates, are known for use in the manufacture of shoe soles. Typical of such systems are blends of polyester polyols and 1,4-butanediol. One commercially available polyester polyol has an hydroxyl number of about 54 and is produced from adipic acid, butanediol and ethylene glycol. When blended with butanediol in a weight ratio of 86:14, the resultant blend has a cloud point of about 72° C. Thus, one problem with the above-noted systems is that the polyol blend is not a single phase mixture unless it is heated to at least the cloud point.

The cloud point is the temperature at which a haze or cloudiness develops in the polyol blend when the blend is slowly cooled with stirring from a temperature sufficiently high to make the mixture a single phase. It is an object of this invention to develop a polyester polyol which when combined with butanediol or ethylene glycol will exhibit significantly lower cloud points than has been achieved with polyester polyols based on adipic acid, butanediol and ethylene glycol.

DESCRIPTION OF THE INVENTION

The present invention is directed to a novel polyester polyol having an hydroxyl number of from about 25 to about 130 and preferably from about 35 to about 65 and an acid number of 2 or less and preferably 1 or less, prepared by reacting:

(a) from about 40 to about 60 parts by weight of adipic acid, (b) from about 1 to about 20 parts by weight of ethylene glycol, (c) from about 1 to about 30 parts by weight of 1,4-butanediol, and (d) from about 5 to about 50 parts by weight of a polyoxyethylene glycol having a molecular weight of from 106 to 680, the total parts by weight of (a), (b), (c) and (d) being 100.

Furthermore, the present invention is directed to a blend of the above-identified polyester polyol and either 1,4-butanediol and/or ethylene glycol in a weight ratio of from 16:1 to 7:3, preferably from 9:1 to 7:3, and most preferably from 9:1 to 8:2. 1,4-butanediol is presently preferred.

The polyoxyethylene glycols useful herein will generally be of the formula:

HO—C$_2$H$_4$O)$_n$H, where n is at least 2 and can be as high as about 15. Such glycols will have molecular weights of from 106 to about 680. Preferred are polyoxyethylene glycols having molecular weights of about 200.

If desired, small amounts (typically from 0.05 to 1 part) of low molecular weight diols (such as tripropylene glycol) and triols (such as trimethylol propane) can also be used in preparing the polyesters herein.

The polyesters of the present invention are made according to known techniques. Typically, the components are reacted at temperatures ranging from 150° to 250° C. and are held at these temperatures for a time sufficient to drop the acid number to 2 or less and preferably to 1 or less. Typically, this time will range from 12 hours to 36 hours. If desired, known esterification catalysts, such as tetrabutyltitanate can be used. The resultant polyols which should have hydroxyl numbers of from about 25 to about 130, and preferably from about 35 to about 65 and an acid number of less than 2 and preferably less than 1, can then be blended with 1,4-butanediol, and/or ethylene glycol, and can then be used for the production of polyurethanes.

The invention is further illustrated but is not intended to be limited by the following examples in which all parts and percentages are by weight unless otherwise specified.

EXAMPLES

Examples 1 through 8

The components noted in Table 1 were mixed and reacted to form polyester polyols having the hydroxyl numbers and acid numbers noted. The procedure followed in each instance was identical. All of the hydroxy functional materials were first charged to a reactor equipped with a mechanical agitator, a distillation column, and condenser. The resultant mixture was then heated to 110° C. at which point the adipic acid was added. Air was then removed by successive evacuations and pressurizations with dry nitrogen gas. The mixture, while protected from the atmosphere with a nitrogen pad, was then heated to about 205° C. During the heating process, when the temperature reached about 145° C., water began to distill from the reaction mixture. After the mixture reached 205° C. and the distillation subsided, the pressure in the reactor was reduced to about 1 mm Hg. The reaction mass was held under these conditions until the acid number dropped to the level noted in Table 1. The viscosity and physical form were measured, with the results shown in Table 1. Blends were then prepared by blending 14 parts of 1,4-butanediol with 86 parts of each polyester. Cloud points were then measured, with the results as set forth in Table 1. Example 1 is a comparative example.

TABLE 1*

| Example | AA | XB | XE | OE | TMP | OEMW | OH# | Acid# | Viscosity @ 73° C. mPa.s | Physical Form @ 25° C. | Cloud Point °C. |
|---|---|---|---|---|---|---|---|---|---|---|---|
| 1 | 61.7 | 22.7 | 15.6 | — | — | — | 54 | 0.7 | 625 | Solid | 72° C. |
| 2 | 60.6 | 6.6 | 19.8 | 13.0 | — | 200 | 55 | 0.92 | 1080 | Solid | 70° C. |
| 3 | 59.4 | 13.4 | 13.5 | 13.5 | 0.2 | 200 | 37 | 0.90 | 1600 | Liquid | 70° C. |
| 4 | 58.3 | 13.9 | 13.9 | 13.9 | — | 200 | 41 | 0.94 | 1600 | Liquid | 70° C. |
| 5 | 56.6 | 21.8 | 7.3 | 14.3 | — | 200 | 60 | 0.71 | 820 | Solid | 59° C. |
| 6 | 52.0 | 27.7 | 1.9 | 18.4 | — | 200 | 57 | 0.27 | 563 | Solid | 52° C. |
| 7 | 47.2 | 6.2 | 4.4 | 42.0 | 0.2 | 200 | 42 | 1.35 | 1051 | Liquid | 51° C. |

TABLE 1*-continued

| Example | AA | XB | XE | OE | TMP | OEMW | OH# | Acid# | Viscosity @ 73° C. mPa.s | Physical Form @ 25° C. | Cloud Point °C. |
|---|---|---|---|---|---|---|---|---|---|---|---|
| 8 | 44.5 | 3.9 | 2.8 | 48.5 | 0.2 | 200 | 39 | 0.20 | 975 | Liquid | 50° C. |

*Explanation - The following abbreviations were used:
AA = parts by weight adipic acid
XB = parts by weight 1,4-butanediol
XE = parts by weight ethylene glycol
OE = parts by weight polyoxyethylene glycol
TMP = parts by weight trimethylol propane
OEMW = molecular weight of the polyoxyethylene glycol
OH# = hydroxyl number, mg/KOH/g
Acid# = acid number, mg/KOH/g Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol having an hydroxyl number of from about 25 to about 130 and an acid number of 2 or less, produced by reacting
    (a) from about 40 to about 60 parts by weight of adipic acid,
    (b) from about 1 to about 20 parts by weight of ethylene glycol,
    (c) from about 1 to about 30 parts by weight of 1,4-butanediol, and
    (d) from about 5 to 50 parts by weight of a polyoxyethylene glycol having a molecular weight of from 106 to 680,
the total parts of (a), (b), (c) and (d) being 100.

2. The polyester polyol of claim 1 having an hydroxyl number of from about 35 to about 65.

3. The polyester polyol of claim 2 having an acid number of 1 or less.

4. The polyester polyol of claim 1 having an acid number of 1 or less.

* * * * *